United States Patent
Yoshida

[11] Patent Number: 6,137,778
[45] Date of Patent: Oct. 24, 2000

[54] CLOCK INFORMATION TRANSFER SYSTEM FOR AAL TYPE 1 TRANSMISSION

[75] Inventor: Kaoru Yoshida, Tokyo, Japan

[73] Assignee: NEC Corporation, Tokyo, Japan

[21] Appl. No.: 09/048,271

[22] Filed: Mar. 26, 1998

[30] Foreign Application Priority Data

Mar. 28, 1997 [JP] Japan .................................. 9-077700

[51] Int. Cl.[7] .............................. H04J 3/06; H04L 7/00; H04L 12/56
[52] U.S. Cl. .......................... 370/231; 370/395; 370/474; 370/516; 375/362; 375/371
[58] Field of Search .................... 370/229, 230, 370/231, 232, 235, 252, 253, 395, 396, 470, 471, 474, 503, 516, 518, 465, 466, 467; 375/362, 371

[56] References Cited

U.S. PATENT DOCUMENTS

| | | | |
|---|---|---|---|
| 5,260,978 | 11/1993 | Fleischer et al. | 375/362 |
| 5,694,397 | 12/1997 | Burton | 370/516 |
| 5,742,649 | 4/1998 | Muntz et al. | 375/371 |
| 5,812,618 | 9/1998 | Muntz et al. | 375/372 |
| 5,822,383 | 10/1998 | Muntz et al. | 375/362 |
| 5,896,427 | 4/1999 | Muntz et al. | 375/372 |

OTHER PUBLICATIONS

ITU–T Recommendations, COM 13–R 51–E, Recommendation I.363.1, Sep. 1995, pp. 3–48.

*Primary Examiner*—Alpus H. Hsu
*Attorney, Agent, or Firm*—Sughrue, Mion, Zinn, Macpeak & Seas, PLLC

[57] ABSTRACT

A clock information transfer system for an AAL type 1 transmission mode includes an ATM transmission device connected to a receiving ATM network. The ATM transmission device has a clock regenerator for regenerating a clock signal of a transmitted CBR signal based on the interval between ATM cell arrival times, an RTS information generating circuit for generating RTS information based on the regenerated clock signal and the network clock signal of the receiving ATM network, an RTS information inserting circuit for inserting the RTS information into an ATM cell signal, multiplexing the ATM cell signal, and outputting the multiplexed ATM cell signal to the receiving ATM network. The clock information transfer system is capable of regenerating a clock signal in transmitting and receiving communication terminals according to an SRTS method for communications between different ATM networks or in the same ATM network.

8 Claims, 2 Drawing Sheets

CLOCK INFORMATION TRANSFER SYSTEM FOR AAL TYPE 1 TRANSMISSION

BACKGROUND OF THE INVENTION

1. Field of the Invention

The present invention relates to a clock information transfer system for an AAL type 1 (ATM Adaptation Layer type 1) transmission mode, and more particularly to a clock information transfer system for an AAL type 1 transmission mode for transmitting clock information from a transmitting device over an ATM (Asynchronous Transfer Mode) transmission path when a CBR (Constant Bit Rate) signal is transmitted as an AAL type 1 ATM cell.

2. Description of the Related Art

For transmitting a CBR signal as an AAL type 1 ATM cell, clock information is transferred from a transmitting device over an ATM transmission path to a receiving device. The receiving device may regenerate a clock signal from the clock information from the transmitting device according to an SRTS (Synchronous Residual Time Stamp) method and an adaptive clock method as described in recommendations of ITU-T (formerly CCITT).

The SRTS method is used when the transmitting and receiving devices are connected to the same ATM network. According to the SRTS method, RTS (Residual Time Stamp) information representing how many clock pulses of a network clock signal correspond to a certain number of clock pulses of the CBR signal of the transmitting device is multiplexed with an ATM cell, and transmitted to the receiving device, in which the clock signal of the transmitting device is regenerated from the received RTS information and the network clock signal.

The adaptive clock method is used when the transmitting and receiving devices are not connected to the same ATM network. According to the adaptive clock method, a CBR signal is separated from an ATM cell and thereafter stored in a buffer memory, after which the stored CBR signal is read from the buffer memory such that the CBR signal stored in the buffer memory will be kept at a constant level. The clock signal with which to read the stored CBR signal from the buffer memory is the clock signal of the transmitting device.

The transfer of the clock information according to the SRTS method requires that the transmitting and receiving devices use a common network clock signal. The SRTS method cannot be used for international communications because the transmitting and receiving devices use different network clock signals.

The adaptive clock method can be used for international communications. However, because of control complexities of the adaptive clock method, it needs a more expensive facility than a CLAD (Cell Assembler and Disassembler) used by the SRTS method, and suffers a poor quality of the regenerated clock signal.

If the transmitting and receiving devices are connected to the same ATM network, then clock information may be transferred from the transmitting device to the receiving device using only the CLAD according to the SRTS method. However, if communications in the same ATM network and communications between different ATM networks are to be selectively performed, then it is necessary to prepare a communication terminal capable of selectively operating according to the SRTS method and the adaptive clock method, and to switch between these SRTS and adaptive clock method. Such a communication terminal results in an expensive system. Furthermore, the communication terminal should recognize at all times which network the remote communication terminal belongs to in switching between the SRTS and adaptive clock method. Consequently, the communication terminal needs to carry out a complicated monitoring action.

SUMMARY OF THE INVENTION

It is an object of the present invention to provide a clock information transfer system for performing communications between communication terminals which belong to the same ATM network or different ATM networks, the clock information transfer system being capable of regenerating a clock signal in transmitting and receiving communication terminals according to the SRTS method, while being not required to change clock transfer processes depending on the ATM network which the remote communication terminal belongs to.

According to the present invention, there is provided a clock information transfer system for an AAL type 1 transmission mode, comprising a plurality of ATM transmission devices connected to respective transmitting and receiving ATM networks which operate with different network clock signals, and transmitting and receiving communication terminals for transmitting a CBR signal therebetween via the ATM networks and the ATM transmission devices connected thereto, wherein the ATM transmission device of the receiving ATM network is connected to an input terminal of the receiving ATM network, and when the ATM transmission device of the receiving ATM network receives an ATM cell signal converted according to AAL type 1 from the transmitted CBR signal from the transmitting ATM network, the ATM transmission device of the receiving ATM network regenerates a clock signal of the transmitted CBR signal from the received ATM cell signal, generates RTS information based on the regenerated clock signal and a network clock signal of the receiving ATM network which is different from a network clock signal of the transmitting ATM network, inserts the generated RTS information into the ATM cell signal at a predetermined position therein, multiplexes the ATM cell signal, and outputs the multiplexed ATM cell signal to the receiving ATM network, for thereby recovering the transmitted CBR signal and transmitting the transmitted CBR signal to the receiving communication terminal.

According to the present invention, there is also provided a clock information transfer system for an AAL type 1 transmission mode for transmitting a CBR signal from a first CBR signal communication terminal connected to a first ATM network via an ATM transmission path to a second CBR signal communication terminal connected to a second ATM network which is synchronous with a network clock signal from a clock frequency source that is different from a clock frequency source of the first ATM network, comprising a first SRTS CLAD connected to an input terminal of the first ATM network, for converting the transmitted CBR signal supplied from the first CBR signal communication terminal into an ATM cell of AAL type 1, including clock information according to a SRTS method, and supplying the ATM cell as a first ATM cell signal to the first ATM network, a first ATM transmission device connected to an output terminal of the first ATM network, for transmitting the first ATM cell signal supplied from the first SRTS CLAD via the first ATM network to the ATM transmission path, a second ATM transmission device connected to an input terminal of the second ATM network, for regenerating, as a first regenerated clock signal, a clock signal of the transmitted CBR signal from the first ATM cell signal transmitted from the first ATM transmission device via the ATM transmission path, generating RTS information from the first regenerated clock signal and the network clock signal of the second ATM network, inserting the RTS information into the ATM cell of the first ATM cell signal, multiplexing the first ATM cell signal, and supplying the multiplexed first ATM cell signal to the second ATM network, and a second SRTS CLAD connected to an output terminal of the second ATM network, for regenerating, as a second regenerated clock signal, a clock signal of the transmitted CBR signal based on the multiplexed RTS information from the multiplexed first ATM cell signal transmitted from the second ATM transmission device via the second ATM network, recovering the transmitted CBR signal from the multiplexed first ATM cell signal based on the second regenerated clock signal, and transmitting the recovered CBR signal to the second CBR signal communication terminal.

The ATM transmission device connected to the receiving or second ATM network may comprise clock regenerating means for regenerating the clock signal of the transmitted CBR signal according to an adaptive clock method from the ATM cell signal, and outputting the regenerated clock signal as a first regenerated clock signal, RTS information generating means for generating RTS information representing how many clock pulses of the network clock signal correspond to a predetermined number of clock pulses of the first regenerated clock signal from the clock regenerating means, based on the first regenerated clock signal from the clock regenerating means and the network clock signal of the receiving or second ATM network, RTS information inserting means for inserting the RTS information into an ATM cell of the ATM cell signal to be outputted to the receiving or second ATM network at a position therein determined by an SRTS method, multiplexing the ATM cell signal, and outputting the multiplexed ATM cell signal to the receiving or second ATM network.

The clock regenerating means may comprise clock generating means for generating a clock signal normally at a predetermined period and generating the first regenerated clock signal when controlled by a clock control signal, and clock control means for counting up the amount of information of the transmitted CBR signal based on the interval between ATM cell arrival times each time an ATM cell of the received ATM cell signal is received, counting down the count with the first regenerated clock signal from the clock generating means, and outputting the clock control signal so that the count will be of a constant value, for thereby controlling the period of the first regenerated clock signal outputted by the clock generating means.

The clock control means may comprise a differential counting circuit comprising an up/down counter for counting the amount of information of the transmitted CBR signal contained in the received ATM cell signal and counting clock pulses of the first regenerated clock signal from the clock generating means, and outputs a differential value which increases when the first regenerated clock signal is slower than the clock information of the transmitted CBR signal and decreases when the first regenerated clock signal is faster than the clock information of the transmitted CBR signal.

The above and other objects, features, and advantages of the present invention will become apparent from the following description with reference to the accompanying drawings which illustrate an example of the present invention.

DETAILED DESCRIPTION OF THE PREFERRED EMBODIMENT

Figure 1:
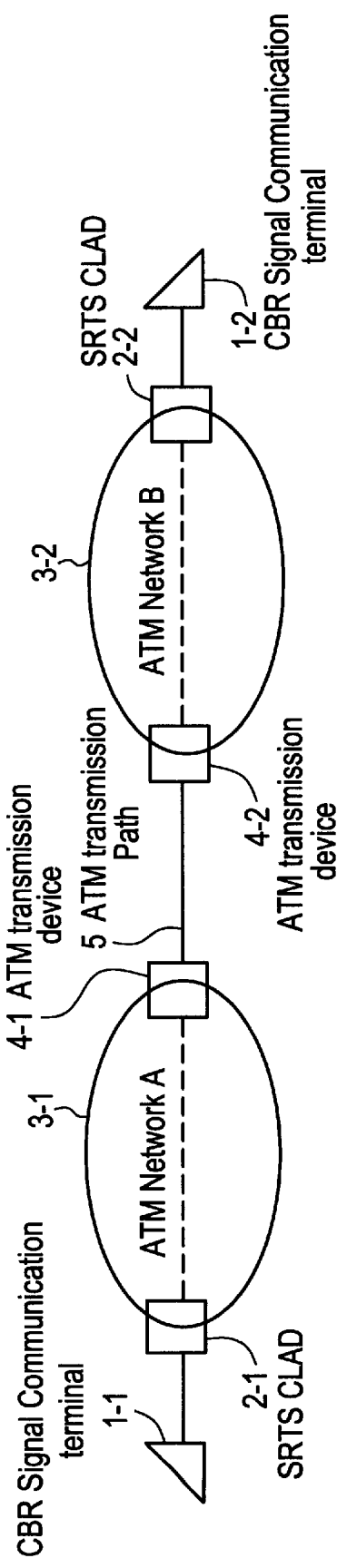
FIG. 1 is a block diagram of a clock information transfer system for an AAL type 1 transmission mode according to the present invention.

As shown in FIG. 1, a clock information transfer system for an AAL type 1 transmission mode according to the present invention transfers clock information for a CBR signal between a CBR signal communication terminal 1-1 connected as a transmitting device to an ATM network A 3-1 and a CBR signal communication terminal 1-2 connected as a receiving device to an ATM network B 3-2 which is synchronous with a clock signal from a clock frequency source that is different from a clock frequency source of the ATM network A 3-1.

Information is transferred between the CBR signal communication terminals 1-1, 1-2 via an SRTS CLAD 2-1 connected to the CBR signal communication terminal 1-1 and the ATM network A 3-1, an ATM transmission device 4-1 connected to the ATM network A 3-1, an ATM transmission path 5 connected to the ATM transmission device 4-1, an ATM transmission device 4-2 connected to ATM transmission path 5 and the ATM network B 3-2, and an SRTS CLAD 2-2 connected to the ATM network B 3-2 and the CBR signal communication terminal 1-2.

The SRTS CLAD 2-1 is connected to an input terminal of the ATM network A 3-1, and serves to convert a transmitted CBR signal supplied from the CBR signal communication terminal 1-1 into an ATM cell of AAL type 1, including clock information according to the SRTS method, and supplies the ATM cell as an ATM cell signal to the ATM network A 3-1. The ATM transmission device 4-1 is connected to an output terminal of the ATM network A 3-1, and serves to transmit the ATM cell signal supplied from the SRTS CLAD 2-1 via the ATM network A 3-1 to the ATM transmission path 5. The ATM transmission device 4-2, which is connected to an input terminal of the ATM network B 3-2, serves to regenerate, as a first regenerated clock signal, a clock signal of the transmitted CBR signal from the ATM cell signal transmitted from the ATM transmission device 4-1 via the ATM transmission path 5, generate RTS information from the first regenerated clock signal and the network clock signal of the ATM network B 3-2, insert the RTS information into the ATM cell of the ATM cell signal, multiplex the ATM cell signal, and supply the multiplexed ATM cell signal to the ATM network B 3-2. The SRTS CLAD 2-2, which is connected to an output terminal of the ATM network B 3-2, serves to regenerate, as a second regenerated clock signal, a clock signal of the transmitted CBR signal based on the multiplexed RTS information from the multiplexed ATM cell signal transmitted from the ATM transmission device 4-2 via the ATM network B 3-2, recover the transmitted CBR signal from the multiplexed ATM cell signal based on the second regenerated clock signal, and transmits the recovered CBR signal to the CBR signal communication terminal 1-2.

Operation of the clock information transfer system shown in FIG. 1 will be described below. It is assumed that a signal is to be transmitted from the CBR signal communication terminal 1-1 belonging to the ATM network A 3-1 to the CBR signal communication terminal 1-2 belonging to the ATM network B 3-2.

A CBR signal from the CBR signal communication terminal 1-1 is received by the SRTS CLAD 2-1. The SRTS CLAD 2-1 converts the received CBR signal into an ATM cell including clock information according to the SRTS method, and supplies the ATM cell to the ATM network A 3-1.

The ATM cell supplied to the ATM network A 3-1 is transmitted via the ATM network A 3-1 and then transmitted from the ATM transmission device 4-1 via the ATM transmission path 5 to the ATM transmission device 4-2 that is connected to the ATM network B 3-2.

The ATM transmission device 4-2 regenerates a clock signal of the transmitted CBR signal from the received ATM cell according to the adaptive clock method, generates RTS information from the regenerated clock signal and the network clock signal of the ATM network B 3-2, inserts the RTS information into the ATM cell, multiplexes the ATM cell, and supplies the multiplexed ATM cell to the ATM network B 3-2.

The multiplexed ATM cell is transmitted via the ATM network B 3-2 to the SRTS CLAD 2-2. The SRTS CLAD 2-2 regenerates a clock signal of the transmitted CBR signal based on the multiplexed RTS information, converts the received ATM cell back into the CBR signal, and transmits the CBR signal to the CBR signal communication terminal 1-2.

As described above, a means for generating RTS information in synchronism with the network clock signal of the ATM network to which the receiving communication terminal is connected is provided in the junction between different ATM networks, and inserts the generated RTS information into an ATM cell. Therefore, even though communications are performed between the different ATM networks, the receiving communication terminal can receive the RTS information generated on the basis of the network clock signal of the ATM network to which the receiving communication terminal is connected, and hence can regenerate a clock signal according to the SRTS method.

Specifically, a converting device for regenerating a clock signal according to the adaptive clock method, generating RTS information, to be transferred according to the SRTS method, from the regenerated clock signal, and inserting the RTS information into an ATM cell is provided in the junction between different ATM networks. Therefore, all CLADs at transmission route ends may be SRTS CLADs.

The transmission of a signal from the CBR signal communication terminal 1-1 to the CBR signal communication terminal 1-2 has been described above. For transmitting a signal from the CBR signal communication terminal 1-2 to the CBR signal communication terminal 1-1, the clock information transfer system shown in FIG. 1 operates in the same manner as described above.

The ATM transmission device 4-2 will be described below.

Figure 2:
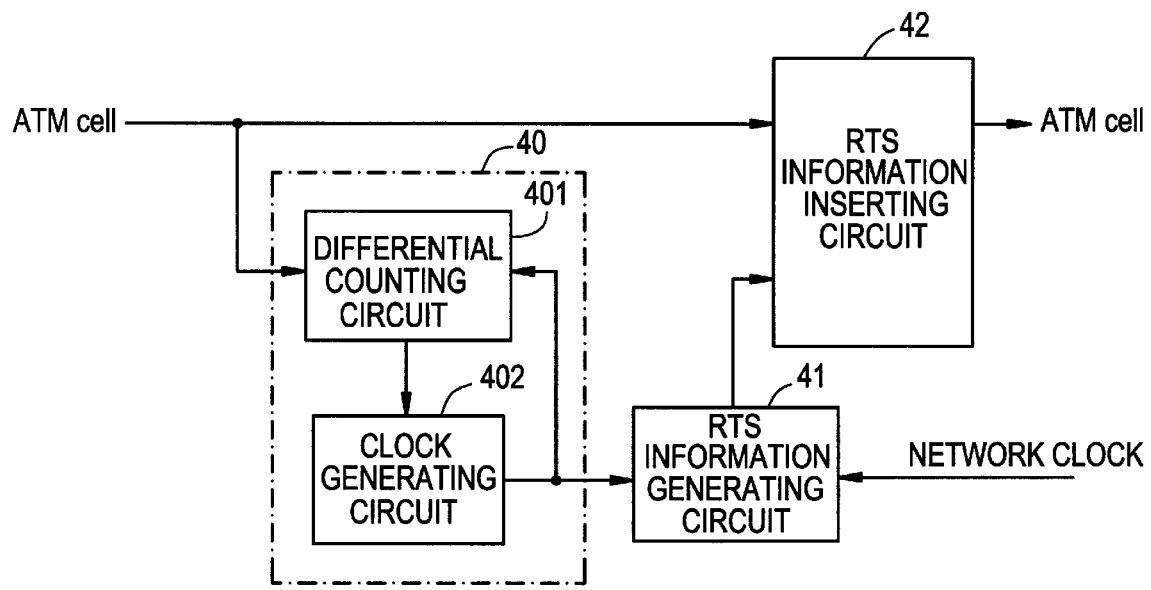
FIG. 2 is a block diagram of an ATM transmission device in the clock information transfer system shown in FIG. 1.

FIG. 2 shows in block form the ATM transmission device 4-2.

As shown in FIG. 2, the ATM transmission device 4-2 comprises a clock regenerator 40 for regenerating a clock signal of a transmitted CBR signal from a received ATM cell signal according to the adaptive clock method and outputting the regenerated clock signal as a first regenerated clock signal, an RTS information generating circuit 41 for generating RTS information, representative of how many clock pulses of a network clock signal correspond to a certain number of clock pulses of the first regenerated clock signal, based on the first regenerated clock signal from the clock regenerator 40 and the network clock signal from a receiving ATM network, and an RTS information inserting circuit 42 for inserting the RTS information from the RTS information generating circuit 41 into an ATM cell of the received ATM cell signal to be transmitted to the receiving ATM network, at a position therein determined by the SRTS method, and multiplexing and outputting the ATM cell signal.

The clock regenerator 40 comprises a clock generating circuit 402 for generating a clock signal normally at a constant period and generating the first regenerated clock signal when controlled by a clock control signal, and a differential counting circuit 401, serving as a clock control means, for counting up the amount of information of the transmitted CBR signal based on the interval between ATM cell arrival times each time an ATM cell of the received ATM cell signal is received, counting down the count with the first regenerated clock signal from the clock generating circuit 402, and outputting the clock control signal so that the count will be of a constant value, for thereby controlling the period of the first regenerated clock signal outputted by the clock generating circuit 402.

The differential counting circuit 401 comprises an up/down counter which counts the amount of information of the transmitted CBR signal contained in the received ATM cell signal and also counts clock pulses of the first regenerated clock signal from the clock generating circuit 402, and outputs a differential value that increases when the first regenerated clock signal is slower than the clock information of the transmitted CBR signal and decreases when the first regenerated clock signal is faster than the clock information of the transmitted CBR signal.

The ATM transmission device shown in FIG. 2 operates as follows: When an ATM cell is received, the differential counting circuit 401 counts the amount of information of a transmitted CBR signal contained in the received ATM cell and clock pulses generated by the clock generating circuit 402 of the clock regenerator 40, and outputs a differential value between the counted values. The clock generating circuit 402 controls the frequency of a clock signal generated thereby with the differential value outputted from the differential counting circuit 401. The differential value outputted from the differential counting circuit 401 increases when the clock signal generated by the clock generating circuit 402 is slower than the clock signal of the transmitted CBR signal, decreases when the clock signal generated by the clock generating circuit 402 is faster than the clock signal of the transmitted CBR signal, and is constant when the clock signal generated by the clock generating circuit 402 and the clock signal of the transmitted CBR signal have the same rate. Therefore, the clock generating circuit 402 increases the frequency of the clock signal generated thereby when the differential value outputted from the differential counting circuit 401 increases, and reduces the frequency of the clock signal generated thereby when the differential value outputted from the differential counting circuit 401 decreases, so that the differential value outputted from the differential counting circuit 401 will be constant. Accordingly, the clock generating circuit 402 generates a clock signal whose frequency is in conformity with the clock frequency of the transmitted CBR signal.

As described above, the differential counting circuit 401 may comprise an up/down counter for counting up the amount of information of the CBR signal contained in the received ATM cell and counting down clock pulses of the clock signal generated by the clock generating circuit 402.

The RTS information generating circuit 41 generates RTS information from the clock signal generated by the clock generating circuit 402 and the network clock signal. The RTS information, which represents how many clock pulses of the network clock signal correspond to a certain number of clock pulses of the clock signal generated by the clock generating circuit 402, may be generated by several counters.

The RTS information generated by the RTS information generating circuit 41 is inserted into the ATM cell to be transmitted at a position therein determined by the SRTS method, by the RTS information inserting circuit 42.

The clock information transfer system according to the present invention is advantageous in that it allows communications between different ATM networks without changing clock information transfer processes depending on the remote communication terminal and makes it unnecessary to confirm the remote communication terminal and change settings of transmission devices.

The above advantages are offered for the following reasons: The ATM transmission device at the junction between different ATM networks regenerates a clock signal of a CBR signal based on the interval between ATM cell arrival times, generates RTS information from a network clock signal of the ATM network to which the receiving communication terminal is connected, and inserts the generated RTS information into an ATM cell. Therefore, even though communications are performed between the different ATM networks, the receiving communication terminal can receive the RTS information generated on the basis of the network clock signal of the ATM network to which the receiving communication terminal is connected, and hence can regenerate a clock signal according to the SRTS method.

While a preferred embodiment of the present invention has been described using specific terms, such description is for illustrative purposes only, and it is to be understood that changes and variations may be made without departing from the spirit or scope of the following claims.

What is claimed is:

1. A clock information transfer system for an ATM Adaptation Layer (AAL) type 1 transmission mode, comprising a plurality of ATM transmission devices connected to respective transmitting and receiving Asynchronous Transfer Mode (ATM) networks which operate with different network clock signals, and transmitting and receiving communication terminals for transmitting a Constant Bit Rate (CBR) signal therebetween via the ATM networks and the ATM transmission devices connected thereto, wherein said ATM transmission device of the receiving ATM network is connected to an input terminal of the receiving ATM network, and when said ATM transmission device of the receiving ATM network receives an ATM cell signal converted according to AAL type 1 from the transmitted CBR signal from the transmitting ATM network, said ATM transmission device of the receiving ATM network regenerates a clock signal of the transmitted CBR signal from the received ATM cell signal, generates Residual Time Stamp (RTS) information based on the regenerated clock signal and a network clock signal of the receiving ATM network which is different from a network clock signal of the transmitting ATM network, inserts the generated RTS information into said ATM cell signal at a predetermined position therein, multiplexes the ATM cell signal, and outputs the multiplexed ATM cell signal to said receiving ATM network, for thereby recovering the transmitted CBR signal and transmitting the transmitted CBR signal to said receiving communication terminal.

2. A clock information transfer system according to claim 1, wherein said ATM transmission device connected to the receiving ATM network comprises:

clock regenerating mean for regenerating the clock signal of the transmitted CBR signal according to an adaptive clock method from the ATM cell signal, and outputting the regenerated clock signal as a first regenerated clock signal;

RTS information generating means for generating RTS information representing how many clock pulses of the network clock signal correspond to a predetermined number of clock pulses of the first regenerated clock signal from said clock regenerating means, based on the first regenerated clock signal from said clock regenerating means and the network clock signal of said receiving ATM network; and RTS information inserting means for inserting said RTS information into an ATM cell of the ATM cell signal to be outputted to said receiving ATM network at a position therein determined by an SRTS method, multiplexing the ATM cell signal, and outputting the multiplexed ATM cell signal to the receiving ATM network.

3. A clock information transfer system according to claim 2, wherein said clock regenerating means comprises:

clock generating means for generating a clock signal normally at a predetermined period and generating said first regenerated clock signal when controlled by a clock control signal; and clock control means for counting up the amount of information of the transmitted CBR signal based on the interval between ATM cell arrival times each time an ATM cell of the received ATM cell signal is received, counting down the count with the first regenerated clock signal from the clock generating means, and outputting the clock control signal so that the count will be of a constant value, for thereby controlling the period of the first regenerated clock signal outputted by said clock generating means.

4. A clock information transfer system according to claim 3, wherein said clock control means comprises:

a differential counting circuit comprising an up/down counter for counting the amount of information of the transmitted CBR signal contained in the received ATM cell signal and counting clock pulses of the first regenerated clock signal from said clock generating means, and outputs a differential value which increases when the first regenerated clock signal is slower than the clock information of the transmitted CBR signal and decreases when the first regenerated clock signal is faster than the clock information of the transmitted CBR signal.

5. A clock information transfer system for an AAL type 1 transmission mode for transmitting a CBR signal from a first CBR signal communication terminal connected to a first ATM network via an ATM transmission path to a second CBR signal communication terminal connected to a second ATM network which is synchronous with a network clock signal from a clock frequency source that is different from a clock frequency source of said first ATM network, comprising:

a first Synchronous Residual Time Stamp Cell Assembler and Disassembler (SRTS CLAD) connected to an input terminal of the first ATM network, for converting the transmitted CBR signal supplied from said first CBR signal communication terminal into an ATM cell of AAL type 1, including clock information according to an SRTS method, and supplying the ATM cell as a first ATM cell signal to said first ATM network;

a first ATM transmission device connected to an output terminal of said first ATM network, for transmitting the first ATM cell signal supplied from said first SRTS CLAD via said first ATM network to the ATM transmission path;

a second ATM transmission device connected to an input terminal of the second ATM network, for regenerating, as a first regenerated clock signal, a clock signal of the transmitted CBR signal from said first ATM cell signal transmitted from said first ATM transmission device via said ATM transmission path, generating RTS information from said first regenerated clock signal and the network clock signal of said second ATM network, inserting the RTS information into the ATM cell of the first ATM cell signal, multiplexing the first ATM cell signal, and supplying the multiplexed first ATM cell signal to said second ATM network; and a second SRTS CLAD connected to an output terminal of said second ATM network, for regenerating, as a second regenerated clock signal, a clock signal of the transmitted CBR signal based on the multiplexed RTS information from the multiplexed first ATM cell signal transmitted from the second ATM transmission device via said second ATM network, recovering the transmitted CBR signal from the multiplexed first ATM cell signal based on the second regenerated clock signal, and transmitting the recovered CBR signal to said second CBR signal communication terminal.

6. A clock information transfer system according to claim 5, wherein said second ATM transmission device comprises:

clock regenerating means for regenerating the clock signal of the transmitted CBR signal according to an adaptive clock method from the first ATM cell signal, and outputting the regenerated clock signal as said first regenerated clock signal;

RTS information generating means for generating RTS information representing how many clock pulses of the network clock signal correspond to a predetermined number of clock pulses of the first regenerated clock signal from said clock regenerating means, based on the first regenerated clock signal from said clock regenerating means and the network clock signal of said second ATM network; and RTS information inserting means for inserting said RTS information into an ATM cell of the ATM cell signal to be outputted to said second ATM network at a position therein determined by the SRTS method, multiplexing the ATM cell signal, and outputting the multiplexed ATM cell signal to the second ATM network.

7. A clock information transfer system according to claim 6, wherein said clock regenerating means comprises:

clock generating means for generating a clock signal normally at a predetermined period and generating said first regenerated clock signal when controlled by a clock control signal; and clock control means for counting up the amount of information of the transmitted CBR signal based on the interval between ATM cell arrival times each time an ATM cell of the received ATM cell signal is received, counting down the count with the first regenerated clock signal from the clock generating means, and outputting the clock control signal so that the count will be of a constant value, for thereby controlling the period of the first regenerated clock signal outputted by said clock generating means.

8. A clock information transfer system according to claim 7, wherein said clock control means comprises:

a differential counting circuit comprising an up/down counter for counting the amount of information of the transmitted CBR signal contained in the received ATM cell signal and counting clock pulses of the first regenerated clock signal from said clock generating means, and outputs a differential value which increases when the first regenerated clock signal is slower than the clock information of the transmitted CBR signal and decreases when the first regenerated clock signal is faster than the clock information of the transmitted CBR signal.

* * * * *